United States Patent Office 3,267,142
Patented August 16, 1966

3,267,142
PROCESS FOR PREPARING OXIMES USING A SILVER CHROMATE AND/OR SILVER DICHROMATE CATALYST
Vernon V. Young, Terre Haute, Ind., assignor to Commercial Solvents Corporation, a corporation of Maryland
No Drawing. Filed Nov. 19, 1964, Ser. No. 412,334
9 Claims. (Cl. 260—566)

My invention relates to the production of oximes, hydroxylamines and amines, and more particularly it relates to a process for producing oximes primary and secondary nitroparaffins containing at least two carbon atoms in the presence of a silver chromate or dichromate catalyst.

This application is a continuation-in-part of application Serial No. 160,299, filed December 18, 1961, and now abandoned.

Oximes have long been prepared by the partial reduction of nitroparaffins. Hydrogenation in the presence of a catalyst is one of the ways by which this reduction can to be made and such a catalytic reduction is disclosed by Grundmann in Angew. Chem., volume 62, pages 558–560 (1950). The Grundmann reference shows reduction of nitrocyclohexane to cyclohexanone oxime using various catalysts, the best catalyst being a silver oxide, zinc oxide, chromium oxide, calcium oxide catalyst.

While a catalyst such as that described above enables production of oximes in reasonable conversions from the nitroparaffin, the results tend to be erratic and often vary widely from batch to batch. Further, the process for preparing the catalyst is a cumbersome, multi-step operation which is expensive and painstaking.

I have now discovered a new process for the production of oximes from which I am able to obtain by the reduction of nitroparaffins consistently greater yields than could heretofore be obtained. My new process is both practical and economical in that it allows the use of catalysts which are easily and inexpensively prepared.

Accordingly to my new process, the nitroparaffin is reduced to the corresponding oxime in the presence of a silver chromate and/or silver dichromate catalyst. The nitroparaffins that can be used are the primary and secondary nitroparaffins containing at least two carbon atoms, for example, nitroethane, 1-nitropropane, 2-nitropropane, 2-nitrobutane, nitrocyclohexane, etc., and the like. Some of the oximes that I can produce are acetaldoxime, propionaldoxime, acetoxime, methylethylketoxime, cyclohexanone oxime, etc. Hydrogen is advantageously used as the reducing agent, and the reduction can be accomplished in a hydrogen atmosphere, preferably under pressure. Generally it is preferable in the reaction to use a solvent. Suitable solvents include the lower alkanols such as methanol.

The reaction of the invention is conducted under reducing conditions of temperature and pressure. Temperature and pressure are influencing factors but are not critical to the process. Hydrogen pressures below 300 p.s.i., although employable, tend to slow the hydrogenation. I therefore prefer to use pressures above 300 p.s.i. generally in the range of from 500 p.s.i. to 1,500 p.s.i. The temperatures I prefer to use in the hydrogenation step of the process are from about 110° C. up to the degradation temperature of the desired oxime. Particularly preferred are temperatures from 110° C. to 200° or 250° C.

The catalyst of the invention can be the silver chromate or silver dichromate per se or either may be employed in combination with a suitable support such as zinc oxide, calcium carbonate, alumina, silica, calcium oxide, calcium phosphates (e.g. $Ca_3(PO_4)_2$ and $Ca\,HPO_4$), titanium oxide and charcoal. In fact in many cases when the silver chromate or dichromate is employed in connection with the aforementioned supports as compared with supports such as barium sulfate and stannic oxide for instance, advantageous improved yields and selectivity to the desired oxime is obtained. Among the supports especially preferred can be named zinc oxide, calcium carbonate, silica, calcium oxide and charcoal, particularly zinc oxide.

The supported silver chromate or dichromate catalyst can be prepared in the following manner:

An aqueous slurry of the support and silver nitrate is formed and the slurry mixed with an aqueous medium containing a source of chromate or dichromate ion to precipitate the catalyst as a solid. The solid precipitate is then separated from the aqueous medium by filtration and dried, for instance at a temperature from about 50 to 110° C., to obtain the active catalyst. In an alternate procedure, a slurry of chromate or dichromate ions and the support can be formed and the silver nitrate then added to the slurry. Any water soluble source of chromate or dichromate ions can be utilized in preparing the catalyst of the invention. Such suitable sources include ammonium dichromate, calcium dichromate, sodium dichromate, potassium dichromate, chromic acid, ammonium chromate, calcium chromate, sodium chromate, potassium chromate and the like.

The catalyst of the present invention is employed in catalytically effective amounts which usually fall in the range of about 0.001 to 10% by weight based on the nitroparaffin feed, preferably 0.1 to 2% by weight. When using the lower amounts of catalyst, higher temperatures can be advantageously used.

Although the final percentages of support and silver chromate or dichromate are not critical when a combination catalyst is used, generally from about 10 to 90 weight percent of the chromate can be used and I prefer for best possible reduction results to utilize a catalyst containing equal amounts by weight of support and silver chromate or dichromate.

The following examples are offered to illustrate my invention; however, I do not intend to be limited by them. Rather, I intend to include within the scope of my invention, all equivalents obvious to those skilled in the art.

*Example 1*

A slurry was prepared from 17 grams of silver nitrate, 21.5 grams of zinc oxide, and 400 milliliters of water. To this slurry were added 13 grams of ammonium dichromate dissolved in 200 milliliters of water to obtain a reddish precipitate. The addition was accomplished at room temperature. The reddish precipitate was then filtered and dried at 100° C. to obtain the catalyst.

*Example 2*

A slurry was prepared from 16.2 grams of calcium dichromate (in the form of the trihydrate), 21.5 grams of zinc oxide, and 350 grams of water. To the slurry were added 17 grams of silver nitrate, dissolved in 200 milliliters of water, to obtain a reddish precipitate. The addition was accomplished at room temperature. The resulting precipitate was then filtered and dried at 100° C. to obtain the catalyst.

*Example 3*

A slurry was prepared from 17 grams silver nitrate, 21.5 grams zinc oxide, and 400 milliliters of water. To this slurry were added 15 grams of sodium dichromate (in the form of the dihydrate) dissolved in 200 milliliters of water to give a reddish precipitate. The addition was accomplished at room temperature. The reddish precipitate was then filtered and dried at 100° C. to obtain the catalyst.

Example 4

A slurry was prepared from 17 grams silver nitrate, 21.5 grams zinc oxide, and 400 milliliters of water. To the slurry were added 15 grams of potassium dichromate in 200 milliliters of water to give a reddish precipitate. The addition was accomplished at room temperature. The reddish precipitate was then filtered and dried at 100° C. to obtain the catalyst.

Example 5

A slurry was prepared from 17 grams silver nitrate, 21.5 grams zinc oxide, and 400 milliliters of water. To this slurry were added 10 grams of chromic acid in 200 milliliters of water to give a reddish precipitate. The precipitate was then filtered and dried at 100° C. to obtain the catalyst.

Example 6

Catalysts prepared as described in Examples 1, 2, 3, 4 and 5 were tested as follows: A 1-liter stainless steel rocking bomb was charged with 390 grams of nitrocyclohexane, 390 grams of methanol solvent, and 4 grams of a sample of catalyst prepared and treated as described in the above examples. Hydrogen under 500 p.s.i. was added and the bomb charge heated to 135° C. The hydrogen pressure was increased to 1,000 p.s.i. and the reduction continued to a hydrogen uptake of 1,000 pounds. Results are shown below.

| Catalyst | Reduction Time, Minutes | Percent Conversion of Nitrocyclohexane to Cyclohexanone Oxime, Cyclohexylhydroxylamine and Cyclohexylamine |
|---|---|---|
| I | 37 | 90 |
| II | 14 | 92 |
| III | 40 | 94 |
| IV | 15 | 95 |
| V | 14 | 90 |

Example 7

The procedure of Example 6 was carried out using the catalyst of Example I with the exception that 2-nitropropane was utilized instead of nitrocyclohexane to obtain acetoxime. Results similar to those of Example 6 were obtained.

Example 8

The procedure of Example 6 was carried out using the catalyst of Example 2 with the exception that 2-nitrobutane was utilized instead of nitrocyclohexane to obtain butanone oxime. Results similar to those of Example 6 were obtained.

Example 9

A silver chromate-zinc oxide catalyst was prepared as follows:

To a stirred suspension of 10.3 grams of silver nitrate and 10.0 grams of zinc oxide in 100 mls. of water, a solution of 3.4 grams of chromic acid, 2.5 grams of calcium hydroxide in 100 mls. of water was added as a fine stream. After addition of the chromate solution was complete, the mixture was stirred for 15 minutes. The catalyst was isolated, washed by reslurrying in 200 mls. of water, refiltered and dried at 100° C. The dried catalyst was passed through a 250-mesh screen.

Examples 10–15

The following silver chromate supported catalysts were prepared using the general procedure of Example 9:

| Example | Composition (wt. Percent/wt. Percent) | Components |
|---|---|---|
| 10 | 80/20 | $Ag_2CrO_4$/ZnO |
| 11 | 50/50 | $Ag_2CrO_4$/ZnO |
| 12 | 20/80 | $Ag_2CrO_4$/ZnO |
| 13 | 50/50 | $Ag_2CrO_4$/$CaCO_3$ |
| 14 | 50/50 | $Ag_2CrO_4$/$Al_2O_3$ |
| 15 | 50/50 | $Ag_2CrO_4$/$SiO_2$ |

Examples 16–28

The catalysts prepared in Examples 10 to 15 were each employed in the following reduction:

To a 1-liter electrically heated stainless steel rocking bomb was charged 390 grams of nitrocyclohexane, 390 grams of methanol, and a given weight of the silver chromate supported catalyst. The bomb was pressured to 500 p.s.i. of hydrogen, heated to 135° C., and hydrogen pressure increased to 1000 p.s.i. Hydrogenation was continued under these conditions to a specific hydrogen pressure drop. Runs were also conducted wherein silver chromate per se was utilized. Results are summarized in Table I below:

Example 29

A silver dichromate-zinc oxide catalyst was prepared as follows:

To a stirred suspension of 7.9 grams of silver nitrate and 10.0 grams of zinc oxide in 100 mls. of water, a solution of 6.9 grams of sodium dichromate dihydrate in 100 mls. of water was added as a fine stream. After addition of the dichromate solution was complete, stirring was continued for 15 minutes. The catalyst was collected on a filter, rinsed with water, and dried at 100° C. The dried catalyst was passed through a 250-mesh screen.

Examples 30–44

The silver dichromate supported catalysts shown in Table II below were all prepared in accordance with the general method described in Example 29.

TABLE I

| Example | Catalyst Components | Wt. (g.)[a] | $H_2$ Drop | Time, Hrs:Min | NCH | Red Mixture, percent by wt. $\varnothing NH_2$[b] | $\varnothing NHOH$ | $\varnothing=NOH$ |
|---|---|---|---|---|---|---|---|---|
| 16 | $Ag_2CrO_4$ | 1.5 | 1,000 | 2:18 | 21.6 | 4.1 | 2.4 | 9.9 |
| 17 | $Ag_2CrO_4$ | 1.5 | 1,000 | 2:15 | 14.3 | 1.4 | 4.2 | 4.1 |
| 18 | $Ag_2CrO_4$ | 1.5 | 1,000 | 0:20 | 12.5 | 1.6 | 6.8 | 6.2 |
| 19 | $Ag_2CrO_4$ | 1.0 | 1,000 | 1:25 | 16.2 | 1.4 | 9.7 | 6.8 |
| 20 | $Ag_2CrO_4$ | 0.5 | 1,000 | 3:10 | | 2.6 | 8.2 | 12.2 |
| 21 | $Ag_2CrO_4$—ZnO, 80/20 | 1.9 | 1,000 | 0:48 | 20.0 | 1.3 | 10.2 | 7.8 |
| 22 | $Ag_2CrO_4$—ZnO, 50/50 | 3.0 | 1,000 | 1:17 | 18.1 | 0.5 | 7.0 | 4.5 |
| 23 | $Ag_2CrO_4$—ZnO, 20/80 | 7.5 | 1,000 | 1:20 | 20.5 | 2.7 | 4.8 | 6.2 |
| 24 | $Ag_2CrO_4$—$CaCO_3$, 50/50 | 3.0 | 1,000 | 0:30 | 13.7 | 6.1 | 3.5 | 8.6 |
| 25 | $Ag_2CrO_4$—$CaCO_3$, 50/50 | 3.0 | 1,000 | 0:38 | 13.5 | 6.5 | 4.7 | 23.8 |
| 26 | $Ag_2CrO_4$—$Al_2O_3$, 50/50 | 3.0 | 1,000 | 0:41 | 12.4 | 2.0 | 7.6 | 4.0 |
| 27 | $Ag_2CrO_4$—$SiO_2$, 50/50 | 3.0 | 1,000 | 0:17 | 14.4 | 4.2 | 5.5 | 8.3 |
| 28 | $Ag_2CrO_4$—$SiO_2$, 50/50 | 1.5 | 1,000 | 1:05 | 14.3 | 1.6 | 7.9 | 14.1 |

[a] Weight of catalyst used based on weight of $Ag_2CrO_4$: 1.5 g. base weight (1.0 g. Ag).
[b] $\varnothing$ = Cyclohexyl.

The prepared catalysts were each employed in the following reduction:

To a 1-liter electrically heated stainless steel rocking bomb was charged 390 grams of nitrocyclohexane, 390 grams of methanol, and a given weight of the supported silver dichromate catalyst. The bomb was pressured to 500 p.s.i. with hydrogen, heated to 135° C., and hydrogen pressure increased to 1000 p.s.i. Hydrogenation was continued under these conditions to specific hydrogen drop or for a definite interval of time. Runs are also included wherein silver dichromate per se was utilized. Results are summarized in Table II below:

TABLE II

| Example | Catalyst | | $H_2$ Drop | Time, Hrs:Min | NCH | Red Mixture, percent by wt. | | |
|---|---|---|---|---|---|---|---|---|
| | Components | Wt. (g.)[a] | | | | $\phi NH_2$ [b] | $\phi NHOH$ | $\phi=NOH$ |
| 30 | $Ag_2Cr_2O_7$ | 2.0 | 1,000 | 6:15 | 21.6 | 2.4 | 0.8 | 12.1 |
| 31 | $Ag_2Cr_2O_7$ | 2.0 | 1,000 | 4:15 | 22.7 | 2.6 | 1.6 | 12.3 |
| 32 | $Ag_2Cr_2O_7$ | 2.0 | 1,000 | 5:25 | 20.7 | 3.5 | 1.0 | 14.0 |
| 33 | $Ag_2Cr_2O_7$—ZnO, 80/20 | 2.5 | 1,000 | 1:20 | 12.1 | 0.7 | 8.6 | 3.4 |
| 34 | $Ag_2Cr_2O_7$—ZnO, 50/50 | 4.0 | 1,000 | 0:37 | 6.9 | 1.1 | 7.3 | 19.9 |
| 35 | $Ag_2Cr_2O_7$—ZnO, 50/50 | 4.0 | 1,000 | 0:32 | 3.7 | 2.1 | 2.6 | 29.3 |
| 36 | $Ag_2Cr_2O_7$—ZnO, 20/80 | 10.0 | 1,000 | 1:15 | 16.4 | 0.9 | 4.6 | 6.4 |
| 37 | $Ag_2Cr_2O_7$—$SiO_2$, 50/50 | 4.0 | 500 | 5:25 | 28.3 | 1.6 | 2.6 | 6.3 |
| 38 | $Ag_2Cr_2O_7$—$Al_2O_3$, 50/50 | 4.0 | 1,000 | 4:14 | 23.8 | 5.2 | 1.9 | 10.0 |
| 39 | $Ag_2Cr_2O_7$—$CaCO_3$, 50/50 | 4.0 | 1,000 | 1:09 | 16.0 | 3.9 | 5.9 | 9.4 |
| 40 | $Ag_2Cr_2O_7$—CaO, 50/50 | 4.0 | 1,000 | 16:05 | 19.1 | 1.8 | Nil | 14.1 |
| 41 | $Ag_2Cr_2O_7$—$CaHPO_4$, 50/50 | 4.0 | 1,200 | 1:35 | 19.9 | 3.5 | 7.7 | 8.4 |
| 42 | $Ag_2Cr_2O_7$—$Ca_3(PO_4)_2$, 50/50 | 4.0 | 1,200 | 2:05 | 18.9 | 3.0 | 4.5 | 12.5 |
| 43 | $Ag_2Cr_2O_7$—$TiO_2$, 50/50 | 4.0 | 1,200 | 1:57 | 21.3 | 2.9 | 6.0 | 9.9 |
| 44 | $Ag_2Cr_2O_7$—Char, 50/50 | 4.0 | 1,200 | 7:18 | 19.0 | 5.6 | Nil | 14.0 |

[a] Weight of catalyst used based on weight of $Ag_2Cr_2O_7$: 2.0 g. base weight (1.0 g. Ag).
[b] $\phi$=Cyclohexyl.

Now having described my invention, what I claim is:

1. A process of the production of oximes which comprises contacting a compound selected from the group consisting of primary and secondary nitroparaffins containing at least two carbon atoms with a catalyst selected from the group consisting of silver chromate and silver dichromate in the presence of hydrogen under reducing conditions of temperature and pressure.

2. The process of claim 1 wherein the nitroparaffin is nitrocyclohexane.

3. The process of claim 1 wherein the nitroparaffin is 2-nitropropane.

4. The process of claim 1 wherein the catalyst is supported with a compound selected from the group consisting of zinc oxide, calcium carbonate, silica, calcium oxide, alumina, calcium phosphate, titanium oxide and charcoal.

5. The process of claim 1 wherein the catalyst is a zinc oxide-silver dichromate catalyst.

6. The process of claim 5 wherein the reaction temperature is about 110° C. up to 250° C. and the hydrogen pressure is about 300 to 1500 p.s.i.

7. The process of claim 1 wherein the nitroparaffins contain 2 to 6 carbon atoms.

8. The process of claim 7 wherein the nitroparaffins are nitroalkanes.

9. The process of claim 1 wherein the nitroparaffin is nitroalkane, the reaction temperature is about 110° C. up to the degradation temperature of the desired oxime and the hydrogen pressure is above about 300 p.s.i.

References Cited by the Examiner
UNITED STATES PATENTS

| | | | |
|---|---|---|---|
| 2,512,653 | 6/1950 | Kapecki | 252—468 |
| 2,567,140 | 9/1951 | Ashley et al. | 252—458 |
| 2,711,427 | 6/1955 | Christian | 260—566 |
| 2,768,206 | 10/1956 | Kaarsemaker | 260—566 |

OTHER REFERENCES

Grundmann, Angew. Chem., vol. 62, pp. 558–560 (1950).

Scwab et al., Ber. Deut. Chem., vol. 91, pp. 525–530 (1958).

CHARLES B. PARKER, *Primary Examiner.*

FLOYD D. HIGEL, *Assistant Examiner.*